(12) United States Patent
Haraguchi

(10) Patent No.: US 8,827,601 B2
(45) Date of Patent: Sep. 9, 2014

(54) END MILL

(71) Applicant: Mitsubishi Materials Corporation, Tokyo (JP)

(72) Inventor: Kazunori Haraguchi, Akashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 162 days.

(21) Appl. No.: 13/633,244

(22) Filed: Oct. 2, 2012

(65) Prior Publication Data
US 2013/0108382 A1 May 2, 2013

(30) Foreign Application Priority Data
Oct. 26, 2011 (JP) .................. 2011-234974

(51) Int. Cl.
*B23C 5/10* (2006.01)
*B23C 5/00* (2006.01)

(52) U.S. Cl.
CPC ............. *B23C 5/10* (2013.01); *B23C 2210/54* (2013.01); *B23C 2210/0492* (2013.01); *B23C 2210/204* (2013.01); *B23C 2210/282* (2013.01); *B23C 2210/64* (2013.01)
USPC ............................................. 407/54; 407/43

(58) Field of Classification Search
USPC .................................. 407/53, 54, 60, 62, 63
See application file for complete search history.

(56) References Cited

U.S. PATENT DOCUMENTS

| | | | | |
|---|---|---|---|---|
| 3,548,476 A | * | 12/1970 | Cave et al. | 407/54 |
| 4,212,568 A | * | 7/1980 | Minicozzi | 407/53 |
| 5,322,394 A | * | 6/1994 | Okanishi et al. | 407/32 |
| 6,899,494 B2 | * | 5/2005 | Walrath | 407/54 |
| 7,153,067 B2 | * | 12/2006 | Greenwood et al. | 407/53 |
| D582,448 S | * | 12/2008 | Boulakhov et al. | D15/139 |
| 8,221,036 B2 | * | 7/2012 | Volokh et al. | 407/54 |
| 2006/0188346 A1 | | 8/2006 | Greenwood et al. | |
| 2010/0196108 A1 | | 8/2010 | Oka et al. | |

FOREIGN PATENT DOCUMENTS

| | | |
|---|---|---|
| DE | 1177904 B | 9/1964 |
| JP | 63-62323 B2 | 9/1987 |
| JP | 01-135408 A | 5/1989 |
| JP | 2005-125465 A | 5/2005 |
| WO | WO-2007/098194 A2 | 8/2007 |
| WO | WO-2008/018062 A2 | 2/2008 |

OTHER PUBLICATIONS

European Search Report dated Feb. 5, 2013, issued for the corresponding European patent application No. 12188650.1.

* cited by examiner

*Primary Examiner* — Will Fridie, Jr.
(74) *Attorney, Agent, or Firm* — Edwards Wildman Palmer LLP

(57) ABSTRACT

An end mill comprising: an odd number of five or more outer peripheral cutting edges formed around a front end portion of the end mill body, the outer peripheral cutting edges being twisted about the axis to a rearward side of a rotational direction of the end mill from a front end of the end mill body toward a rear end side thereof and being arranged at intervals in a circumferential direction; and bottom cutting edges which are formed at the front end of the end mill body so as to respectively extend from tips of the outer peripheral cutting edges toward the axis, and wherein the outer peripheral cutting edges have different helix angles with respect to the axis between the outer peripheral cutting edges adjacent to each other in the circumferential direction.

2 Claims, 6 Drawing Sheets

END MILL

TECHNICAL FIELD

The present invention relates to an end mill in which an odd number of five or more outer peripheral cutting edges is formed around a front end portion of an end mill body made to rotate about an axis, and the front end portion of the end mill body is formed with bottom cutting edges extending from the tips of the outer peripheral cutting edges to the inner peripheral sides thereof toward the axis, whereby, by setting the outer peripheral cutting edges to have different helix angles, the pitches between the bottom cutting edges in a circumferential direction thereof are also made to differ from one another.

BACKGROUND ART

An end mill in which a plurality of outer peripheral cutting edges has different helix angles is known as being able to prevent the deterioration and the like of surface finish accuracy due to so-called chattering vibration since vibrations generated at an end mill body during cutting cancel each other out between the outer peripheral cutting edges having the different helix angles. Such an end mill is disclosed in, for example, Patent Document 1 in which the pitches between the outer peripheral cutting edges in a circumferential direction of each thereof are equal to one another at a range between one third of a cutting edge length from an end of each outer peripheral cutting edge, which is located at a rotational direction side of the end mill, and a central portion of the outer peripheral cutting edge, thereby preventing a width in a circumferential direction of a cutting chip discharge flute from being excessively narrowed at the end of the outer peripheral cutting edge.

RELATED ART DOCUMENT

Patent Document

[Patent Document 1] Japanese Examined Patent Application Publication No. 63-62323

DISCLOSURE OF THE INVENTION

Problem that the Invention is to Solve

Meanwhile, in the end mill having the four outer peripheral cutting edges disclosed in Patent Document 1, every other outer peripheral cutting edge has the same helix angle in the circumferential direction. However, in the end mill having an odd number of five or more outer peripheral cutting edges, when the helix angles of the outer peripheral cutting edges adjacent to each other in the circumferential direction are set to differ, the end mill requires two groups of outer peripheral cutting edges having the same helix angle at every other edge in the above-mentioned circumferential direction, and one group of outer peripheral cutting edges having helix angles different from these two groups of outer peripheral cutting edges, in order to minimize the number of groups of outer peripheral cutting edges having different helix angles.

However, in such an end mill, the pitches between the outer peripheral cutting edges in the circumferential direction become equal to one another at positions other than the tips of each outer peripheral cutting edge, such as the range between one third of the above-mentioned cutting edge length and the central portion. Accordingly, when at least a portion of the pitches between the tips of the five or more outer peripheral cutting edges in the circumferential direction differs from the other pitches, at least a portion of the pitches, which are between the bottom cutting edges, which respectively extend from the tips of the outer peripheral cutting edges toward the axis, in a circumferential direction thereof, differs from the other pitches. Thus, when grooving or the like is performed by such an end mill, cutting chip clogging is easily generated at the bottom cutting edges having small pitches in relation to the adjacent bottom cutting edges in a rotational direction side of the end mill, thereby leading to an increase in cutting resistance, or easily causing chipping or damage.

The present invention has been made in view of the above-mentioned circumstances, and an object of the present invention is to provide an end mill having an odd number of five or more outer peripheral cutting edges having different helix angles, and bottom cutting edges, wherein the end mill is able to prevent an increase in cutting resistance, chipping, or damage due to cutting chip clogging caused by the bottom cutting edges having a small pitch in a rotational direction side of the end mill even when the pitches between at least the portions of the bottom cutting edges in a circumferential direction thereof differ from those between the other bottom cutting edges.

Means for Solving the Problem

In order to solve the problems and achieve the object, the present invention provides an end mill including: an end mill body which is rotated about an axis; an odd number of five or more outer peripheral cutting edges formed around a front end portion of the end mill body, the outer peripheral cutting edges being twisted about the axis to a rearward side of a rotational direction of the end mill from a front end of the end mill body toward a rear end side thereof and being arranged at pitches in a circumferential direction; and bottom cutting edges which are formed at the front end of the end mill body so as to respectively extend from tips of the outer peripheral cutting edges toward the axis, the number of the bottom cutting edges being the same as the number of the outer peripheral cutting edges, wherein the outer peripheral cutting edges have different helix angles with respect to the axis between the outer peripheral cutting edges adjacent to each other in the circumferential direction, at least a portion of the bottom cutting edges has a pitch between the bottom cutting edges adjacent to each other in the rotational direction of the end mill, the pitch differing from the pitches between the other bottom cutting edges such that, among the bottom cutting edges, the bottom cutting edge having the smallest pitch becomes a long bottom cutting edge which extends up to a position going past the axis, and the other bottom cutting edges are formed so as not to go past the axis.

In the end mill having the odd number of five or more outer peripheral cutting edges and the same number of bottom cutting edges, according to the above-mentioned configuration, since the helix angles between the outer peripheral cutting edges adjacent to each other in the circumferential direction differ from one another, vibrations generated during cutting by the outer peripheral cutting edges may cancel each other out. Furthermore, for example, the pitches between the outer peripheral cutting edges in the circumferential direction become equal to one another at positions other than the tips of each outer peripheral cutting edge, and thus at least a portion of the bottom cutting edges may have a pitch between the bottom cutting edges adjacent to each other in the rotational direction of the end mill, wherein the pitch differs from the pitches between the other bottom cutting edges. Accordingly, since the vibrations generated during cutting by the bottom cutting edges periodically differ from one another, it may be possible to more reliably prevent the generation of chattering vibration.

On the other hand, the pitches between the bottom cutting edges adjacent to each other in the circumferential direction differ from one another, and thus a gash capacity between the bottom cutting edges in the rotational direction side of the end mill is decreased, thereby easily generating cutting chip clogging as described above, at the bottom cutting edge having the smallest pitch in the rotational direction side of the end mill. However, in the end mill having the above configuration, the bottom cutting edge having the smallest pitch becomes the long bottom cutting edge extending up to a position going past the axis which is a center of the front end of the end mill body, and the other bottom cutting edges are formed so as not to go past the axis. As a result, the capacity of the gash leading to the long bottom cutting edge may be made greater than the gashes leading to the other bottom cutting edges, and it may be possible to prevent the generation of cutting chip clogging by securing cutting chip discharge properties.

Moreover, in order to reliably provide the vibration prevention effect due to the differences in the helix angles of the outer peripheral cutting edges and obtain ease of design by restricting the number of groups of the outer peripheral cutting edges having different helix angles to the minimum as described above, the odd number of five or more outer peripheral cutting edges may include one middle twisted outer peripheral cutting edge having a helix angle different from the other outer peripheral cutting edges, a plurality of strong twisted outer peripheral cutting edges which have helix angles larger than those of the middle twisted outer peripheral cutting edge, and weak twisted outer peripheral cutting edges of which the number is the same as the number of the strong twisted outer peripheral cutting edges and which have helix angles less than those of the middle twisted outer peripheral cutting edge, and the strong twisted outer peripheral cutting edges and the weak twisted outer peripheral cutting edges are preferably alternately arranged in the circumferential direction.

Advantage of the Invention

As described above, according to the present invention, it may be possible to prevent deterioration and the like of surface finish accuracy due to the chattering vibration. In addition, it may be possible to secure cutting chip discharge properties even in bottom cutting edges having a small pitch in relation to the bottom cutting edges adjacent in a rotational direction side of the end mill, thereby preventing the generation of cutting chip clogging, an increase in cutting resistance, chipping or damage to the bottom cutting edge, and the like.

BEST MODE FOR CARRYING OUT THE INVENTION

Figure 1:
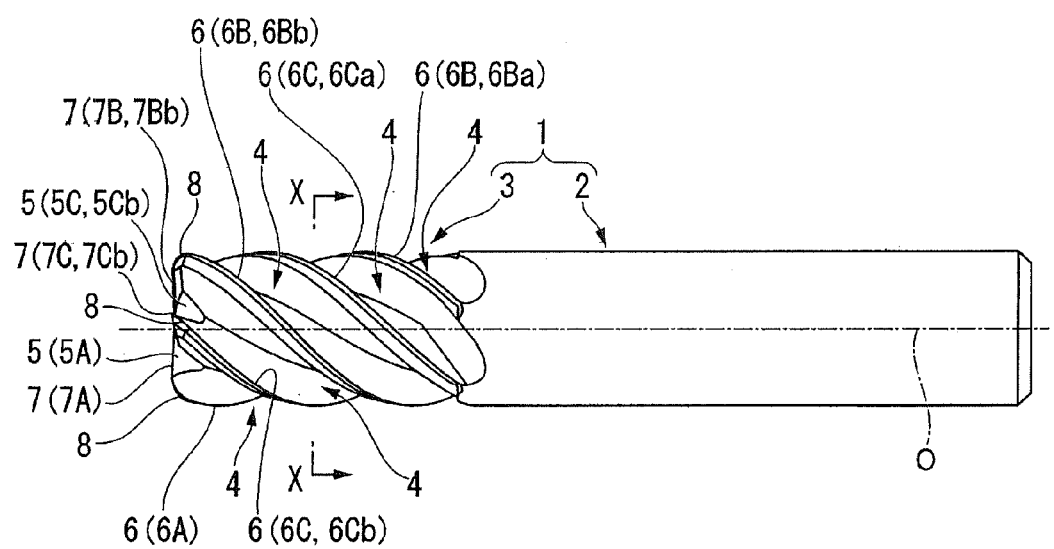
FIG. 1 is a side view illustrating a first embodiment of the present invention.

FIGS. 1 to 4 are diagrams illustrating a first embodiment of the present invention. In the present embodiment, an end mill body 1 is made of a hard material such as cemented carbide, and has an external shape formed in a substantially columnar shape about an axis O. A rear end side (right sides in FIGS. 1 and 5, and the upper side in FIG. 4) portion thereof is set as a shank portion 2 retaining the columnar shape, while a front end side (left sides in FIGS. 1 and 5, and the lower side in FIG. 4) portion thereof is set as a cutting edge portion 3. In such an end mill, a cutting process is performed on a work material by cutting edges formed at the cutting edge portion 3 by feeding the shank portion 2 in a direction intersecting the axis O while the shank portion 2 is rotated about the axis O in a rotational direction T of the end mill in a state of being held at the main spindle of a machine tool.

The cutting edge portion 3 of the front end of the end mill body 1 is formed, at an outer periphery thereof, with a plurality of cutting chip discharge flutes 4, which are twisted about the axis O to a rearward side of the rotational direction T of the end mill from the front end of the end mill body 1 toward the rear end side thereof and are arranged at intervals in a circumferential direction. The number of these cutting chip discharge flutes 4 is an odd number of five or more, and, in the present embodiment, the number is five. Also, each of the cutting chip discharge flutes 4 is formed, at a front end portion thereof, with a gash 5 in such a way that the cutting chip discharge flute 4 is cut off from a wall surface thereof facing the rotational direction T side of the end mill to an inner peripheral side thereof across a flute bottom.

An outer peripheral cutting edge 6 is formed at an outer peripheral side ridge portion of the wall surface of the cutting chip discharge flute 4 facing the rotational direction T side of the end mill. A bottom cutting edge 7 is formed at a front end side ridge portion of a wall surface of the gash 5 facing the rotational direction T side of the end mill so as to extend toward the axis O in the front end of the end mill body 1 from a tip of the outer peripheral cutting edge 6 toward an inner periphery thereof. Accordingly, the number of the outer peripheral cutting edges 6 is the same as the number of the bottom cutting edges 7 and is an odd number of five or more, in the same manner as the number of the cutting chip discharge flutes 4. In the present embodiment, the number of these cutting edges is five.

The end mill of the present embodiment is a radius end mill. That is, a corner cutting edge 8 is formed at a corner portion, at which each outer peripheral cutting edge 6 and the associated bottom cutting edge 7 intersect, around the front end of the end mill body 1. The corner cutting edge 8 is formed as a quarter convex arc shape in a rotational trajectory about the axis O in a state of contact with the outer peripheral cutting edge 6 and the bottom cutting edge 7. Also, the rotational trajectory of each outer peripheral cutting edge 6 is located on one cylindrical surface about the axis O, whereas the rotational trajectory of each bottom cutting edge 7 is located on one planar surface perpendicular to the axis O or on one concave conical surface which is slightly recessed to a rear end side of the axis O according to facing the inner peripheral side with respect to the planar surface.

Figure 3:
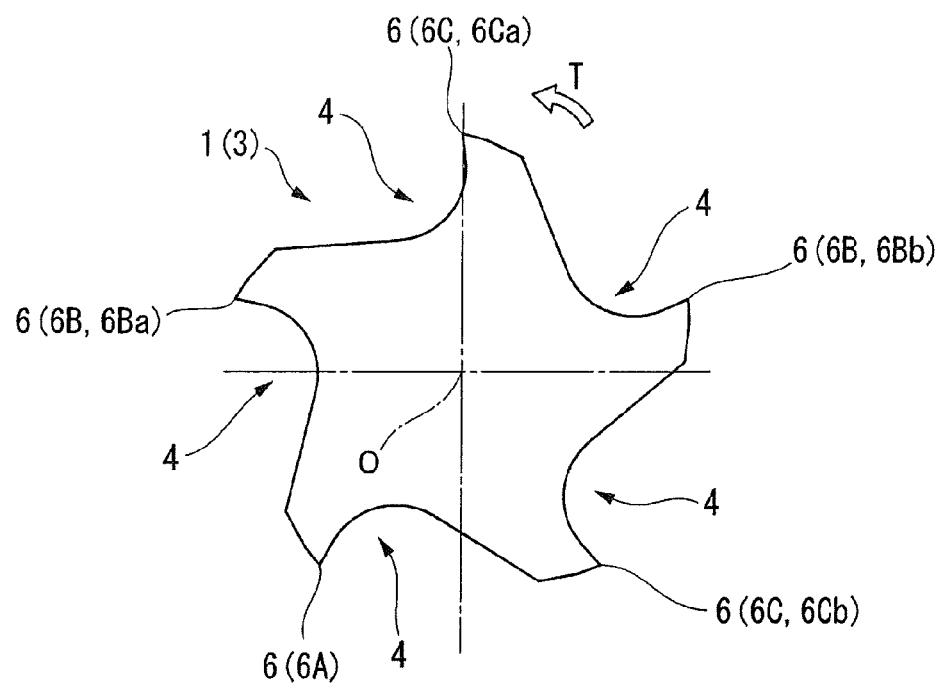
FIG. 3 is an enlarged cross-sectional view taken along X-X of FIGS. 1 and 5.
Figure 4:
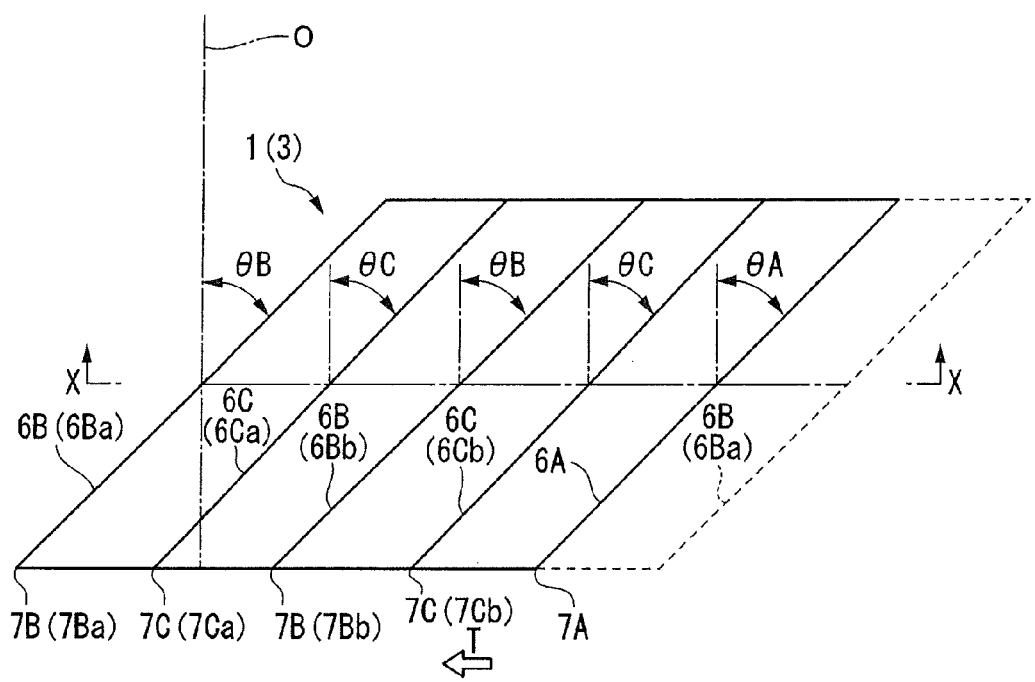
FIG. 4 is a development view of outer peripheral cutting edges in the embodiment shown in FIG. 1.

Also, similarly to twists given to the cutting chip discharge flutes 4, each outer peripheral cutting edge 6 forms a helix angle θ with the axis O so as to face in the rearward side of the rotational direction T of the end mill about the axis O from the tip of the outer peripheral cutting edge toward the rear end side thereof. However, although the helix angle θ is uniform in each outer peripheral cutting edge 6, the helix angles are different between the outer peripheral cutting edges 6 adjacent to each other in the circumferential direction. Accordingly, pitches between the outer peripheral cutting edges 6 adjacent to each other in the circumferential direction are gradually changed toward the axis O direction, but the pitches between the outer peripheral cutting edges in the circumferential direction become equal to one another at positions other than the tip of each outer peripheral cutting edge 6 in the axis O direction. In the present embodiment, the pitches between the outer peripheral cutting edges 6 in the circumferential direction become equal to one another at an intermediate position (positions of the X-X cross-sections in FIGS. 1, 4, and 5) of the cutting edge portion 3 in the axis O direction as shown in FIG. 3.

In more detail, in the present embodiment, the outer peripheral cutting edges 6 having the different helix angles θ are constituted of three groups of outer peripheral cutting edges 6A, 6B, and 6C which consist of one middle twisted outer peripheral cutting edge 6A, a plurality of strong twisted outer peripheral cutting edges 6B, and weak twisted outer peripheral cutting edges 6C. The middle twisted outer peripheral cutting edge 6A has a helix angle θA different from the other outer peripheral cutting edges 6. The plural strong twisted outer peripheral cutting edges 6B have helix angles θB which are larger than those of the middle twisted outer peripheral cutting edge 6A and equal to each other. The number of the weak twisted outer peripheral cutting edges 6C is the same as the number of the strong twisted outer peripheral cutting edges 6B, and the weak twisted outer peripheral cutting edges 6C have helix angles θC which are less than those of the middle twisted outer peripheral cutting edge 6A and equal to each other. Here, the end mill having the five outer peripheral cutting edges in the present embodiment is formed with two strong twisted outer peripheral cutting edges 6Ba and 6Bb and two weak twisted outer peripheral cutting edges 6Ca and 6Cb.

Furthermore, the strong twisted outer peripheral cutting edges 6B and the weak twisted outer peripheral cutting edges 6C are alternately arranged in the circumferential direction. In addition, the middle twisted outer peripheral cutting edge 6A is disposed adjacent to one strong twisted outer peripheral cutting edge 6Ba in the rotational direction T side of the end mill. That is, in the present embodiment, the strong twisted outer peripheral cutting edge 6Ba, the weak twisted outer peripheral cutting edge 6Ca, the strong twisted outer peripheral cutting edge 6Bb, and the weak twisted outer peripheral cutting edge 6Cb are arranged in this order from the middle twisted outer peripheral cutting edge 6A toward the rearward side of the rotational direction T of the end mill.

The helix angles θ are different between the outer peripheral cutting edges 6 adjacent to each other in the circumferential direction, and thus the pitches between the outer peripheral cutting edges 6 adjacent to each other in the circumferential direction are gradually changed according to the distance in the axis O direction from the intermediate position of the cutting edge portion 3. Accordingly, considering the case of being separated toward the front end side of the end mill body 1, the pitches between the respective weak twisted outer peripheral cutting edges 6C and the respective strong twisted outer peripheral cutting edges 6B adjacent thereto in the rotational direction T side of the end mill are gradually increased in the circumferential direction. On the other hand, the pitch between the middle twisted outer peripheral cutting edge 6A and the weak twisted outer peripheral cutting edge 6Cb adjacent thereto in the rotational direction T side of the end mill, the pitch between the middle twisted outer peripheral cutting edge 6A and one strong twisted outer peripheral cutting edge 6Ba adjacent thereto in the rearward side of the rotational direction T of the end mill, and the pitch between the other strong twisted outer peripheral cutting edge 6Bb and the weak twisted outer peripheral cutting edge 6Ca adjacent thereto in the rotational direction T side of the end mill are gradually decreased in the circumferential direction. Also, in the case of being distant from the intermediate position toward the rear end side of the end mill body 1, all of the pitches are changed in the opposite manner to the above-mentioned case.

However, a difference between the helix angle θB of the strong twisted outer peripheral cutting edge 6Ba and the helix angle θA of the middle twisted outer peripheral cutting edge 6A adjacent thereto in the rotational direction T side of the end mill, and a difference between the helix angle θA of the middle twisted outer peripheral cutting edge 6A and the helix angle θC of the weak twisted outer peripheral cutting edge 6Cb adjacent thereto in the rotational direction T side of the end mill are smaller than the difference between the helix angle θB of the other strong twisted outer peripheral cutting edge 6Bb and the helix angle θC of the weak twisted outer peripheral cutting edge 6Ca adjacent thereto in the rotational direction T side of the end mill. Therefore, the ratio in which the pitch in the circumferential direction is gradually decreased becomes the largest between the other strong twisted outer peripheral cutting edge 6Bb and the weak twisted outer peripheral cutting edge 6Ca adjacent thereto in the rotational direction T side of the end mill.

Accordingly, even in the pitches in the circumferential direction of the bottom cutting edges 7 leading to the respective tips of the outer peripheral cutting edges 6, for example, the pitches between outer peripheral ends of the bottom cutting edges 7 adjacent to each other in the circumferential direction on a circumference passing through the outer peripheral ends of the bottom cutting edges 7 about the axis O, a portion of the pitches between the outer peripheral ends of the bottom cutting edges 7 adjacent to each other differs from the other pitches according to the pitches between the outer peripheral cutting edges 6. Among these, the pitch between the bottom cutting edge 7Bb leading to the tip of the other strong twisted outer peripheral cutting edge 6Bb through the corner cutting edge 8 and the bottom cutting edge 7Ca adjacent thereto in the rotational direction T side of the end mill becomes the smallest. Moreover, the bottom cutting edge 7 leading to the tip of each outer peripheral cutting edge 6 through the corner cutting edge 8 in FIGS. 2 and 4, and the gash 5 formed on the wall surface in which each bottom cutting edge 7 faces the rotational direction T side of the end mill are denoted with the same subscript (letters) as the outer peripheral cutting edge 6 in FIG. 2.

Thereby, the bottom cutting edge 7Bb having the smallest pitch between the bottom cutting edge 7Bb and the bottom cutting edge 7Ca adjacent thereto in the rotational direction T side of the end mill becomes a long bottom cutting edge which extends up to a position going past the axis O in the front end of the end mill body 1, and the other bottom cutting edges 7 do not go past the axis O. Moreover, in the other bottom cutting edges 7, the bottom cutting edge 7A leading to the tip of the middle twisted outer peripheral cutting edge 6A through the corner cutting edge 8 becomes the next long intermediate bottom cutting edge, and the bottom cutting edges 7Ba, 7Ca, and 7Cb other than the bottom cutting edge 7A become short bottom cutting edges having substantially the same lengths. Accordingly, the bottom cutting edge 7A which is the intermediate bottom cutting edge is located at a substantially opposite side across the axis O with respect to the gash 5Bb leading to the bottom cutting edge 7Bb which is the long bottom cutting edge.

Figure 2:
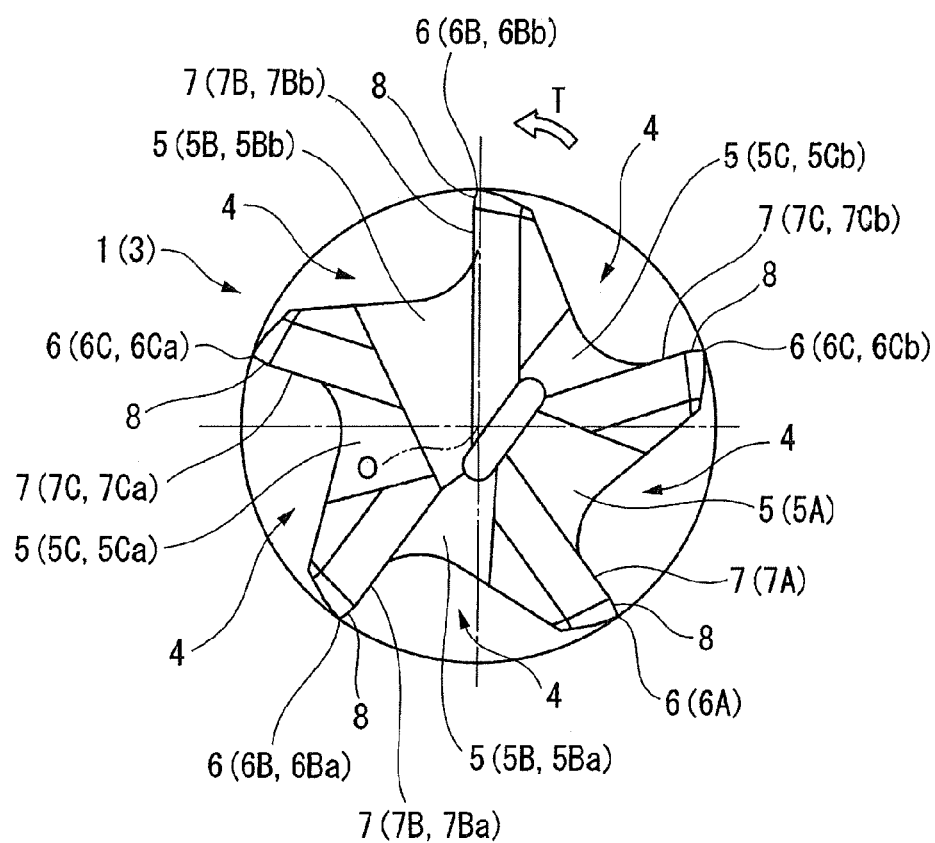
FIG. 2 is an enlarged front view of the embodiment shown in FIG. 1.

Also, in the present embodiment, as shown in FIG. 2 when viewed from the front, each bottom cutting edge 7 extends straightly toward the axis O from an inner peripheral end of the associated corner cutting edge 8. Thus, the bottom cutting edge 7 is located slightly to the rotational direction T side of the end mill with respect to a radius line passing through the axis O in parallel with the straight line of the bottom cutting edge 7.

In the end mill having such a configuration, the outer peripheral cutting edges 6 adjacent to each other in the circumferential direction have different helix angles θ. Thus, in the present embodiment, the pitches between the outer peripheral cutting edges 6 in the circumferential direction differ from one another except for the intermediate position of the cutting edge portion 3 in the axis O direction, and the pitches between the bottom cutting edges 7 adjacent to each other in the circumferential direction also differ from one another. Therefore, since the vibrations generated by the outer peripheral cutting edges 6 and the bottom cutting edges 7 during cutting cancel each other out, it may be possible to prevent chattering vibration from being generated due to periodic vibrations in a slot milling process and the like and to achieve an improvement in the surface finish accuracy.

On the other hand, among the bottom cutting edges 7 having the different pitches in the circumferential direction, the bottom cutting edge 7Bb having the smallest pitch between the bottom cutting edges 7 adjacent to each other in the rotational direction T side of the end mill becomes the long bottom cutting edge which extends up to the vicinity closest to the position of the axis O and goes past the axis O. Thus, the gash 5Bb, which leads to the bottom cutting edge 7Bb as the long bottom cutting edge and in which the bottom cutting edge 7Bb is formed at the front end side ridge portion of the wall surface facing the rotational direction T side of the end mill, is also formed to extend to the vicinity closest to the axis O and go past the axis O in the front end of the end mill body 1. As a result, it may be possible to increase the capacity of the gash 5Bb in comparison with those of the gashes 5A, 5Ba, 5Ca, and 5Cb leading to the other bottom cutting edges 7A, 7Ba, 7Ca, and 7Cb.

Accordingly, in accordance with the end mill having the above-mentioned configuration, it may be possible to secure desirable cutting chip discharge properties even in the bottom cutting edge 7Bb in which cutting chip clogging is easily generated by a decrease in pitch between the bottom cutting edges 7 (7Ca) adjacent to each other in the rotational direction T side of the end mill. Also, it may be possible to prevent the cutting chip clogging of the bottom cutting edges 7 in the slot milling process and the like from being generated by matching the other bottom cutting edges 7A, 7Ba, 7Ca, and 7Cb having relatively large pitches between the bottom cutting edges 7 in the rotational direction T side of the end mill. For this reason, it may be possible to prevent an increase in cutting resistance due to such cutting chip clogging, chipping or damage to the bottom cutting edges 7, and the like, and to perform a smooth cutting process.

In addition, in the present embodiment, the outer peripheral cutting edges 6 having the different helix angles θ are constituted of the three groups of the outer peripheral cutting edges 6A, 6B, and 6C which consist of one middle twisted outer peripheral cutting edge 6A, the plural (two) strong twisted outer peripheral cutting edges 6B (6Ba and 6Bb), and the weak twisted outer peripheral cutting edges 6C (6Ca and 6Cb). The middle twisted outer peripheral cutting edge 6A has a helix angle θA different from the other outer peripheral cutting edges 6. The plural strong twisted outer peripheral cutting edges 6B (6Ba and 6Bb) have helix angles θB which are larger than those of the middle twisted outer peripheral cutting edge 6A. The number of the weak twisted outer peripheral cutting edges 6C (6Ca and 6Cb) is the same as the number of the strong twisted outer peripheral cutting edges 6B, and the weak twisted outer peripheral cutting edges 6C have helix angles θC which are less than those of the middle twisted outer peripheral cutting edge 6A. Among these, the strong twisted outer peripheral cutting edges 6B and the weak twisted outer peripheral cutting edges 6C are alternately arranged in the circumferential direction, except for the middle twisted outer peripheral cutting edge 6A.

For this reason, in the odd number of five or more outer peripheral cutting edges 6, it may be possible to easily design the outer peripheral cutting edges 6 in such a way that the helix angles θ of the outer peripheral cutting edges 6 adjacent to each other are designed to be reliably different from each other and the different helix angles θ are restricted to a minimum of three kinds. On the other hand, since pluralities of the strong twisted outer peripheral cutting edges 6B and the weak twisted outer peripheral cutting edges 6C, which have the largest difference between the helix angles θ, are alternately arranged in the circumferential direction, it may be possible to more reliably exhibit the effect to preventing vibrations by the strong and weak twisted outer peripheral cutting edges 6B and 6C.

Moreover, in the present embodiment, among the strong and weak twisted outer peripheral cutting edges 6B and 6C which are alternately arranged as described above, the middle twisted outer peripheral cutting edge 6A is disposed in the rotational direction T side of the end mill of the strong twisted outer peripheral cutting edges 6B (rearward side of the rotational direction T of the end mill of the weak twisted outer peripheral cutting edges 6C). However, in contrast to the above, the middle twisted outer peripheral cutting edge 6A may be disposed in the rotational direction T side of the end mill of the weak twisted outer peripheral cutting edges 6C (rearward side of the rotational direction T of the end mill of the strong twisted outer peripheral cutting edges 6B). Also, in the present embodiment, the odd number of five or more outer peripheral cutting edges 6 is constituted of the three groups of outer peripheral cutting edges 6A, 6B, and 6C as described above, but the outer peripheral cutting edges 6 may be constituted of four or more groups of outer peripheral cutting edges 6.

Figure 5:
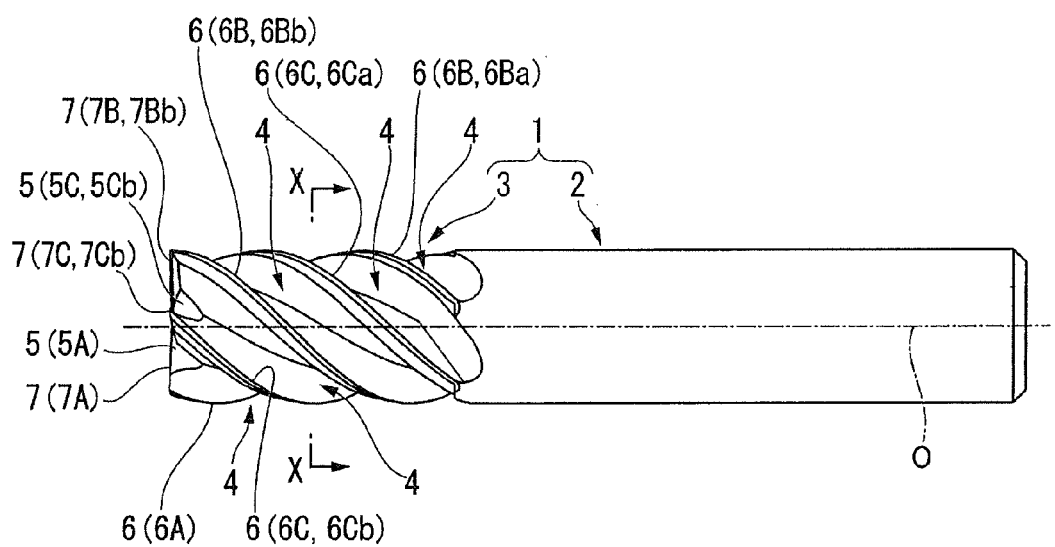
FIG. 5 is a side view illustrating a second embodiment of the present invention.
Figure 6:
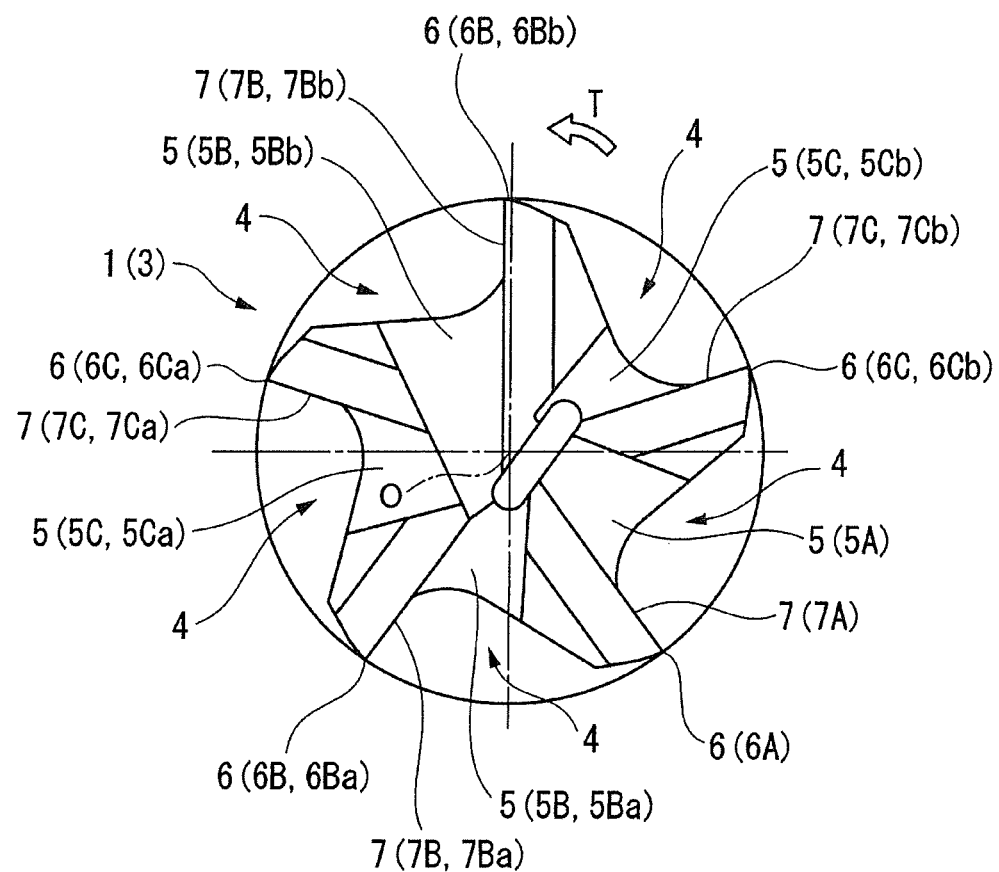
FIG. 6 is an enlarged front view of the embodiment shown in FIG. 5.

Furthermore, although the present invention has been described with respect to the first embodiment applied to the radius end mill in which the outer peripheral cutting edges 6 and the bottom cutting edges 7 are continuous through the corner cutting edges 8, the present invention may be applied to a square end mill in which the outer peripheral cutting edges 6 and the bottom cutting edges 7 have a right angle or an acute angle close to the right angle and intersect without passing through the corner cutting edges 8, as the second embodiment shown in FIGS. 5 and 6. Here, the same elements in the second embodiment as the constituent elements in the first embodiment are denoted by the same reference numerals.

DESCRIPTION OF REFERENCE NUMERALS AND SIGNS

1: end mill body
2: shank portion

3: cutting edge portion
4: cutting chip discharge flute
5: gash
5A: gash leading to bottom cutting edge 7a
5B (5Ba and 5Bb): gash leading to bottom cutting edge 7B (7Ba and 7Bb)
5C (5Ca and 5Cb): gash leading to bottom cutting edge 7C (7Ca and 7Cb)
6: outer peripheral cutting edge
6A: middle twisted outer peripheral cutting edge
6B (6Ba and 6Bb): strong twisted outer peripheral cutting edge
6C (6Ca and 6Cb): weak twisted outer peripheral cutting edge
7: bottom cutting edge
7A: bottom cutting edge leading to middle twisted outer peripheral cutting edge 6A
7B (7Ba and 7Bb): bottom cutting edge leading to strong twisted outer peripheral cutting edge 6B (6Ba and 6Bb)
7C (7Ca and 7Cb): bottom cutting edge leading to weak twisted outer peripheral cutting edge 6C (6Ca and 6Cb)
8: corner cutting edge
O: axis of end mill body 1
T: rotational direction of end mill
θ: helix angle of outer peripheral cutting edge 6
θA: helix angle of middle twisted outer peripheral cutting edge 6A
θB: helix angle of strong twisted outer peripheral cutting edge 6B (6Ba and 6Bb)
θC: helix angle of weak twisted outer peripheral cutting edge 6C (6Ca and 6Cb)

The invention claimed is:

1. An end mill comprising:
an end mill body which is rotated about an axis thereof;
an odd number of five or more outer peripheral cutting edges formed around a front end portion of the end mill body, the outer peripheral cutting edges being twisted about the axis to a rearward side of a rotational direction of the end mill from a front end of the end mill body toward a rear end side thereof and being arranged at intervals in a circumferential direction; and
bottom cutting edges which are formed at the front end of the end mill body so as to respectively extend from tips of the outer peripheral cutting edges toward the axis, the number of the bottom cutting edges being the same as the number of the outer peripheral cutting edges,
wherein the outer peripheral cutting edges have different helix angles with respect to the axis between the outer peripheral cutting edges adjacent to each other in the circumferential direction, and
wherein at least a portion of the bottom cutting edges has a pitch between the bottom cutting edges adjacent to each other in the rotational direction of the end mill, the pitch differing from the pitches between the other bottom cutting edges such that, among the bottom cutting edges, the bottom cutting edge having the smallest pitch becomes a long bottom cutting edge which extends up to a position going past the axis, and the other bottom cutting edges are formed so as not to go past the axis.

2. The end mill according to claim 1,
wherein the odd number of five or more outer peripheral cutting edges include one middle twisted outer peripheral cutting edge having a helix angle different from the other outer peripheral cutting edges, a plurality of strong twisted outer peripheral cutting edges which have helix angles larger than those of the middle twisted outer peripheral cutting edge, and weak twisted outer peripheral cutting edges of which the number is the same as the number of the strong twisted outer peripheral cutting edges and which have helix angles less than those of the middle twisted outer peripheral cutting edge, and the strong twisted outer peripheral cutting edges and the weak twisted outer peripheral cutting edges are alternately arranged in the circumferential direction.

* * * * *